United States Patent
Sirkett et al.

(10) Patent No.: US 8,584,547 B2
(45) Date of Patent: Nov. 19, 2013

(54) ROBOT PART AND A METHOD FOR PROTECTING A ROBOT PART

(75) Inventors: Daniel Sirkett, Västerås (SE); Ivan Lundberg, Västerås (SE); Timothy Vittor, Ladenburg (DE)

(73) Assignee: ABB Research Ltd. (CH)

( * ) Notice: Subject to any disclaimer, the term of this patent is extended or adjusted under 35 U.S.C. 154(b) by 138 days.

(21) Appl. No.: 12/829,049

(22) Filed: Jul. 1, 2010

(65) Prior Publication Data

US 2011/0095457 A1   Apr. 28, 2011

Related U.S. Application Data

(63) Continuation of application No. PCT/EP2009/063922, filed on Oct. 22, 2009.

(51) Int. Cl.
*B25J 18/06*   (2006.01)

(52) U.S. Cl.
USPC .......................... 74/490.01; 901/49; 403/223

(58) Field of Classification Search
USPC ...................... 74/490.01, 490.05; 901/28, 49; 403/220, 223
See application file for complete search history.

(56) References Cited

U.S. PATENT DOCUMENTS

| | | | | |
|---|---|---|---|---|
| 5,697,480 A | * | 12/1997 | Herbermann et al. | 192/56.32 |
| 5,732,599 A | | 3/1998 | Iriyama | |
| 5,909,938 A | * | 6/1999 | Brenner et al. | 33/503 |
| 7,069,664 B2 | | 7/2006 | Raab et al. | |
| 2003/0167647 A1 | | 9/2003 | Raab et al. | |
| 2005/0103147 A1 | | 5/2005 | Lee et al. | |
| 2009/0095109 A1 | * | 4/2009 | Mizuno et al. | 74/490.01 |

FOREIGN PATENT DOCUMENTS

| | | |
|---|---|---|
| EP | 0988939 A1 | 3/2000 |
| JP | 5023992 A | 2/1993 |

OTHER PUBLICATIONS

International Search Report and Written Opinion of the International Searching Authority; PCT/EP2009/063922; Jan. 13, 2010; 9 pages.

* cited by examiner

*Primary Examiner* — William C Joyce
*Assistant Examiner* — Terence Boes
(74) *Attorney, Agent, or Firm* — St. Onge Steward Johnston & Reens LLC

(57) ABSTRACT

A robot part, such as a robot arm or a robot joint, surrounded by an impact absorbing structure is provided. According to the invention, the impact absorbing structure has a shroud surrounding the robot part. The shroud is mounted on two spacing elements such that an interspace is formed between the shroud and the robot part. At least one of the spacing elements mounts the shroud elastically. Also provided is a method of protecting a robot part by providing the robot part with an impact absorbing structure according to the invention.

17 Claims, 2 Drawing Sheets

ROBOT PART AND A METHOD FOR PROTECTING A ROBOT PART

CROSS-REFERENCE TO RELATED APPLICATIONS

The present application is a continuation of pending International patent application PCT/EP2009/063922 filed on Oct. 22, 2009, which designates the United States and the content of which is incorporated herein by reference.

FIELD OF THE INVENTION

The present invention in a first aspect relates to a robot part, such as a robot arm or a robot joint, including an impact absorbing structure surrounding the robot part.

In a second aspect the invention relates to a method for protecting a robot part by surrounding the robot part with an impact absorbing structure.

BACKGROUND OF THE INVENTION

Industrial robots often operate in an environment where the robot unintentionally might come into contact with other object such as humans working in the local, other robots, other tooling machines or objects on which work is performed. This implies a risk that the robot itself or the object with which it collides might be damaged or a person might be injured. A large part of these risks can be avoided by logistic measures, however not always to 100%. It is therefore a need to provide some kind of protection on those parts of the robot for which there is a collision risk, in particular elbows and the like where there are joints between arms of the robot. It is thus known to apply an impact absorbing structure surrounding such robot parts. It is also known to provide robot parts with a protective cover in order to protect components related to the robot from being affected by contamination of the atmosphere around the robot, e.g. protecting cables from being affected by paint mist or the like.

Examples of protection structures protecting against impacts and/or contamination can be found in U.S. Pat. No. 5,732,599, EP 0988939, JP 5023992, US 20050103147 and U.S. Pat. No. 7,069,664.

To achieve that an industrial robot that operates alongside human workers is intrinsically safe structural parts of the robot is encased in an impact absorbing material.

A further requirement in terms of safety is that cabling in the robot arm has to be concealed in order to prevent accidents by entanglement. In arrangements where hollow-shaft drive trains are not employed, the pressure of padding on the outside of the robot structure conflicts with free movement of the cables. The conflict may be resolved by introducing a volume of free space in which the cable can move between the rotating joint components and the padding. However, this enlarges the outer dimensions of the arm thereby compromising its working range.

There might also be other reasons that lead to a requirement of a free space between the robot part and the surrounding protective padding.

SUMMARY OF THE INVENTION

The object of the present invention is to improve a protective impact absorbing structure of a robot part including such a structure.

In particular the object is to meet the need for achieving a free space between the robot part and the impact absorbing structure without the drawbacks normally entailing such a construction.

This object is according to the first aspect of the invention achieved by a robot assembly including a robot part such as a robot arm or a robot joint, and an impact absorbing structure surrounding the robot part, having the specific features that the impact absorbing structure includes a shroud surrounding the robot part and at least two spacing elements on which the shroud is mounted such that an interspace is formed between the shroud and the robot part and that at least one of the spacing elements mounts the shroud elastically.

By the elastic mounting of the shroud the energy developed from an impact on the shroud is taken up by the spacing element that elastically mounts the shroud. Thereby the shroud can be provided with a much thinner layer of padding material than without this elastic mounting. With a sufficient elasticity of the mounting it is possible to completely leave out any layer of padding material on the shroud.

Thereby the dimension of the impact absorbing structure will be substantially reduced in comparison with a structure without such elastic mounting where the complete impact energy has to be absorbed by a surrounding padding. Through the invention thus is achieved that a free space is created between the impact absorbing structure and the robot part while maintaining required impact absorption without substantially increasing the external dimensions of the structure.

According to a preferred embodiment, both the spacing elements mount the shroud elastically.

The advantages mentioned above gained by the invention are more accentuated with this embodiment since the elastic mounting of the shroud is more complete and homogeneous. The impact effect therefore will be more independent with respect of the location of the impact on the shroud. Preferably the shroud is mounted at each of its end with the elastic spacing elements.

According to a further preferred embodiment at least one of said spacing elements is at least partly made of padding material.

This is a very simple and reliable way of obtaining the elastic mounting.

According to a further preferred embodiment, at least one of the spacing elements includes a first section connected to the shroud, a second section connected to the robot part and an intermediate section connecting the first and second sections, which intermediate section has a higher flexibility than each of the first and second sections.

By providing an intermediate section with higher flexibility than the rest of the spacing element, the elasticity of the mounting can be further increased.

Preferably the intermediate section has smaller dimensions in at least one direction than the first and second sections.

According to a further preferred embodiment the spacing element has a generally annular shape, defining an axis, whereby the first and second sections are axially separated by the intermediate section and the intermediate section has a smaller radial thickness than the first and second sections.

Thereby a thin waist is formed, which is a constructionally simple way of increasing the flexibility at the intermediate part for increasing the elasticity of the mount.

The arrangement thereby provides equivalent impact absorption to a full-thickness of padding while preserving a concealed void space for e.g. free movement of cables.

According to a further preferred embodiment, the robot part includes a joint between a first and a second robot component that are rotatable in relation to each other, and a first of the spacing elements is attached to the first component and a second of the spacing elements is attached to the second component.

The need for a free space within the impact absorbing structure is particularly present when the robot part is a rotational joint. This embodiment therefore represents an important application of the invention.

According to a further preferred embodiment, the first spacing element is provided with an outer and inner bearing sleeve, on which outer bearing sleeve the shroud is journalled, and which inner bearing sleeve is journaled on the second component.

This solves in an advantageous way the need to arrange for a relative rotation between the shroud and one of the spacing elements. The journaling on the second component stabilizes a correct alignment between the units that cooperate to form the protection of the joint.

According to a further preferred embodiment, the shroud at least partly is of plastic material.

When using plastic material for the shroud it will be possible to find a material that is semi-rigid at a suitable level. Thereby the shroud itself will absorb impact energy to a certain extent by a certain degree of deformation. The semi-rigid material is also advantageous for attaining a bodily displacement thereof that is transferred to the spacing elements.

According to a further preferred embodiment, the shroud is provided with a padding material enclosure attached to the outside of the shroud.

Although the impact absorbing structure according to the invention includes the alternative that the shroud has no external padding material, the presence of such an enclosure further increases the advantages of the invention. In this way, the robot part is provided with two separate impact absorbing mechanisms, a bodily displacement of the plastic shroud to absorb low-frequency energy, and local deformation of the enclosing padding material to absorb high-frequency energy of the initial impact. Deformation of the padding enclosure at the collision site spreads the impact force over a larger area thereby minimizing local contact pressure at the surface.

The padding enclosure will have a thickness that is many times smaller than a conventional padding enclosure. The padding enclosure, however, can have a thickness that is many times larger than the thickness of the shroud. Preferably the padding material enclosure has a thickness that is within the range of 1-20 times the thickness of the shroud.

According to a further preferred embodiment, at least one cable is located within the interspace.

One of the most important reasons for providing an interspace of this kind is to provide space for concealed cables. The presence of a cable in the interspace therefore represents a very valuable application of the present invention.

According to a further preferred embodiment, at least a portion of the interspace has a distance between the robot part and the shroud that is in the range of 1.1-1.5 times the diameter of the cable.

It is advantageous that there is a certain clearance for the cable, since an impact on the impact absorbing structure will result in a certain radial deformation thereof. Should the impact site happen to be directly above the cable it is by the clearance avoided that the cable thereby will be squeezed and possibly damaged.

The lower limit of the range is normally sufficient to achieve this effect. However a larger clearance results in a greater security in this respect. An unnecessary large clearance should be avoided in order not to reduce the space saving achieved by the invention. Therefore the clearance should be smaller than the upper limit. Although the clearance need not be present along the complete extent of the impact absorbing structure and need not be equal along the complete extension it is preferred that there is a clearance within the specified range along the complete extension.

Usually a cable has a circular cross section and thus a diameter. However there exists cables with non-circular cross section. For such a cable the term diameter should be interpreted as the smallest dimension of the cross section of the cable.

The above specified preferred embodiments are set out in the dependent claims. It is to be noted that further preferred embodiments can be realized by any possible combination of preferred embodiments mentioned above.

The object of the invention is further achieved in that an industrial robot comprises a robot part assembly according to the present invention, in particular to any of the preferred embodiments thereof.

The object is further achieved in that an impact absorbing structure for a part of an industrial robot includes the features of the impact absorbing structure specified for the robot arm provided with such according to the present invention, in particular to any of the preferred embodiments thereof.

Finally the object is achieved in that a method of the initially specified kind includes the specific steps of mounting at least two spacing elements on the robot part, mounting a shroud on the spacing elements such that an interspace is formed between the shroud and the robot part, whereby the shroud is mounted elastically on at least one of the spacing elements.

According to preferred embodiments of the invented method, the method is carried out in a way such that the impact absorbing structure thereof will have the features specified in the preferred embodiments of the invented robot part assembly.

The invented industrial robot, the invented impact absorbing structure and the invented method and the preferred embodiments of these have the same advantages as the invented robot part and its preferred embodiments, respectively, which advantages have been described above.

The invention will be further explained by the following illustrative example of a robot part according to the invention and with reference of the accompanying drawings.

DETAILED DESCRIPTION OF THE INVENTION

Figure 1:
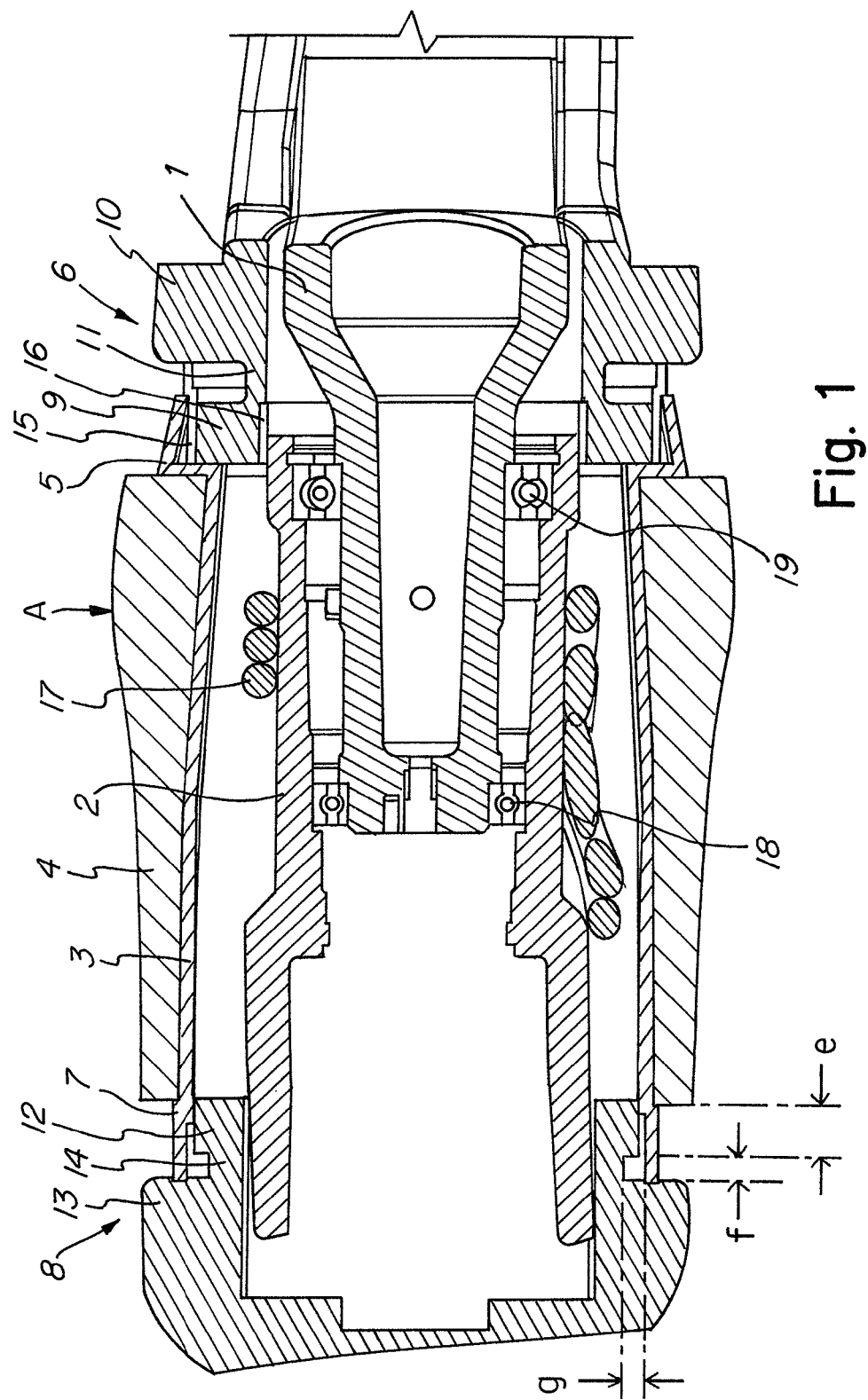
FIG. 1 is a cross section through a robot part according to the invention.

FIG. 1 is a schematic axial section through a roll-type robot joint, having a first robot component 1 and a second robot component 2, which are rotatable relative to each other. The second robot component 2 is journalled in roller bearings 18, 19 on the first robot component 1. The joint is covered by an impact absorbing structure, thus forming a robot part assembly comprising the robot part of the joint and the impact absorbing structure.

The structure has a shroud 3 of semi-rigid plastic material. The shroud 3 is enclosed by a padding material enclosure 4. The shroud 3 is mounted on the robot part with a first axial flange 5 on a first spacing element 6 fixedly attached to the first robot component 1 and with a second axial flange 7 on a second spacing element 8 fixedly attached to the second robot component 2.

The spacing elements 6, 8 are made of padding material. The padding material can be of any kind commonly used for protecting machine parts such as robot parts. Such materials are well known in the art and need no further description.

The first spacing element 6 has three sections, a first section 9 on which the first flange 5 of the shroud 3 is mounted, a second section 10 connected to the first robot component 1 and an intermediate section 11 forming a waist between the other two. Correspondingly the second spacing element 8 has a first section 12 on which the second flange 7 of the shroud 3 is mounted, a second section 13 connected to the second robot component 2 and an intermediate section 14 forming a waist.

The shroud 3 is non-rotatable in relation to the second robot component 2 and consequently rotatable in relation to the first robot component 1. Thus the first spacing element 6 is rotatable in relation to the second robot component 2 as well as in relation to the shroud 3. For this reason a thin, flexible hard-wearing bearing sleeve 15 made from low-friction plastic is provided between the first section 9 of the first spacing element 6 and the shroud 3. A similar bearing sleeve 16 is provided between the first section 9 of the first spacing element 6 and the second robot component 2.

An annular interspace is established between the shroud 3 and the second robot component 2. A cable 17 is located in this interspace. The interspace provides sufficient space for the cable to move freely therein during rotation of the joint since the thickness of the annular interspace is larger than the diameter of the cable 17.

Should a collision occur, e.g. at arrow A, the plastic shroud moves bodily as the impact energy is absorbed through viscoelastic deformation of the spacing elements 6, 8 on which it is supported. The waist sections 11, 12 of the spacing elements 6, 8 reduce the stiffness of the support and absorb impact energy. The padding enclosure 4 on the outside of the shroud contributes to absorb the high-frequency energy of the initial impact.

The radial deformation of the respective first section 9, 12 of the spacing elements 6, 8 is relatively small in relation to the total thickness g. A 10 mm thick spacing element deforms about 2 mm. This deformation determines the dimensioning of the annular interspace inside the shroud in relation to the diameter of the cable 17, and should thus be at least 2 mm wider than the cable diameter in the example mentioned.

The padding properties of the arrangement are tuned without affecting the external appearance thereof. Tuning is achieved by adjusting the dimension e, f and g of each spacing element 6, 7 rather than altering the radial thickness of external padding 4.

Figure 2:
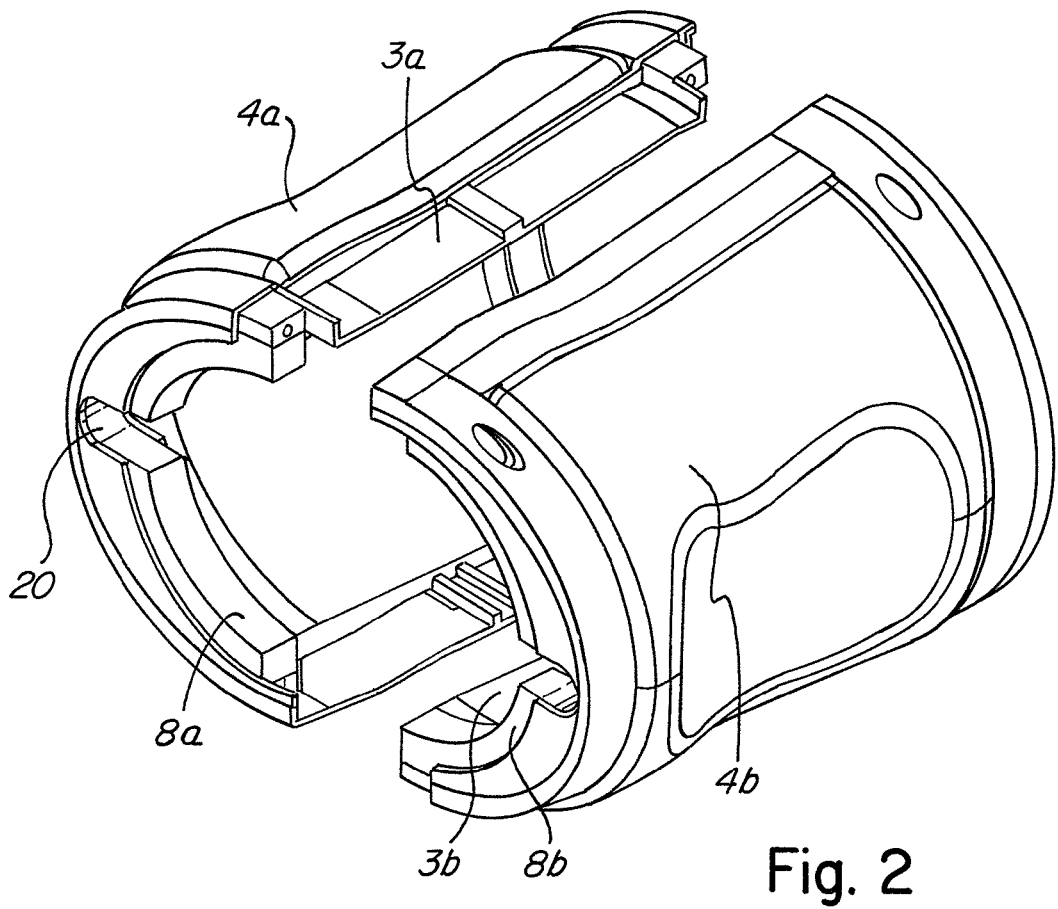
FIG. 2 is a split perspective view of an impact absorbing structure for a robot arm according to the invention before assembly.

FIG. 2 illustrates an impact absorbing structure according to another example of the invention. The figure shows how the structure can be made by two identical halves which may be screwed together after cabling has been installed on the robot arm. Each half consists of an injection-moulded plastic inner chassis 3a, 3b which together form a shroud.

On the outside of each chassis 3a, 3b padding material 4a,4b bounded. The spacing element is in this example formed by a separate padding insert 8a, 8b on each half and may be bounded into a slot or other locating means in the inside of the chassis 3a, 3b. The padding inserts 8a, 8b are arranged to be located in an annular groove running around the outer surface of the robot component (not shown) to which it is to be attached. Slot 20 provides a cable entry.

Figure 3:
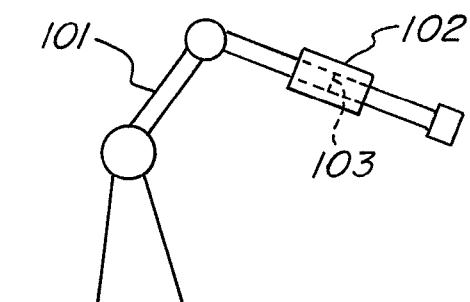
FIG. 3 is a schematic side view of an industrial robot according to the invention.

FIG. 3 schematically illustrates an industrial robot 101 that is provided with an impact absorbing structure 102 according to the invention, around a rotational joint 103 of the robot.

What is claimed is:

1. An impact absorbing structure for a robot part of an industrial robot comprising: a shroud arranged for surrounding the robot part; and
at least two spacing elements on which the shroud is mounted such that an interspace is formed between the shroud and the robot part, and such that at least one of the spacing elements mounts the shroud elastically, wherein at least one of said spacing elements includes a first section connected to the shroud, a second section connected to the robot part and an intermediate section connecting the first and second section, which intermediate section has a higher flexibility than each of the first and second sections, and wherein the spacing element has a generally annular shape defining an axis, whereby the first and second sections are axially separated by the intermediate section and the intermediate section has a smaller radial thickness than the first and second sections.

2. The impact absorbing structure of claim 1, wherein both said at least two spacing elements mount the shroud elastically.

3. The impact absorbing structure of claim 1, wherein at least one of said spacing elements is at least partly made of padding material.

4. The impact absorbing structure of claim 1, wherein at least one of said spacing elements includes a section that has a higher flexibility than other sections thereof, by means of which the shroud is mounted elastically.

5. The impact absorbing structure of claim 1, wherein the shroud is provided with a padding material enclosure attached on an outside of the shroud.

6. A robot part assembly comprising:
a robot part; and
an impact absorbing structure surrounding the robot part, the impact absorbing structure including a shroud surrounding the robot part and at least two spacing elements on which the shroud is mounted,
wherein an interspace is formed between the shroud and the robot part and at least one of the spacing elements mounts the shroud elastically,
wherein at least one of said spacing elements includes a first section connected to the shroud, a second section connected to the robot part and an intermediate section connecting the first and second section, which intermediate section has a higher flexibility than each of the first and second sections, and
wherein the spacing element has a generally annular shape defining an axis, whereby the first and second sections are axially separated by the intermediate section and the intermediate section has a smaller radial thickness than the first and second sections.

7. A robot part assembly of claim 6, wherein both of said at least two spacing elements mount the shroud elastically.

8. The robot part assembly of claim 6, wherein that at least one of said spacing elements at least partly is made of padding material.

9. The robot part assembly of claim 6, wherein the robot part includes a joint between a first and second robot component that are rotatable relative to each other and in that a first of said spacing elements is attached to the first robot component and a second of said spacing elements is attached to the second robot component.

10. The robot part assembly of claim 9, wherein the first spacing element is provided with an outer bearing sleeve and an inner bearing sleeve, the shroud being journalled on the outer bearing sleeve and the inner sleeve being journalled on the second robot component.

11. The robot part of claim 6, wherein the shroud is at least partly made of plastic material.

12. The robot part assembly of claim 6, wherein the shroud is provided with a padding material enclosure attached on an outside of the shroud.

13. The robot part assembly of claim 6, wherein at least one cable is located in said interspace.

14. The robot part assembly of claim 13, wherein at least a portion of the interspace has a distance between the robot part and the shroud that is in the range of 1.1-1.5 times a diameter of the cable.

15. An industrial robot comprising the robot part assembly of claim 6.

16. The robot part of claim 6, wherein the robot part is a robot arm or a robot joint.

17. A method for protecting a robot part by surrounding the robot part with an impact absorbing structure, the method comprising the steps of:
providing a robot part and an impact absorbing structure surrounding the robot part;
mounting at least two spacing elements on the robot part; and
mounting a shroud on said spacing elements such that an interspace is formed between the shroud and the robot part, whereby the shroud is mounted elastically on at least one of the spacing elements, wherein at least one of said spacing elements includes a first section connected to the shroud, a second section connected to the robot part and an intermediate section connecting the first and second section, which intermediate section has a higher flexibility than each of the first and second sections, and wherein the spacing element has a generally annular shape defining an axis, whereby the first and second sections are axially separated by the intermediate section and the intermediate section has a smaller radial thickness than the first and second sections.

* * * * *